United States Patent [19]
Suzuki et al.

[11] Patent Number: 5,775,288
[45] Date of Patent: Jul. 7, 1998

[54] COMBUSTION CHAMBER

[75] Inventors: Yuichi Suzuki; Akira Serizawa, both of Iwata, Japan

[73] Assignee: Yamaha Hatsudoki Kabushiki Kaisha, Iwata, Japan

[21] Appl. No.: 698,387

[22] Filed: Aug. 15, 1996

[30] Foreign Application Priority Data

Aug. 17, 1995 [JP] Japan .................................. 7-209573

[51] Int. Cl.⁶ .................................................... F02B 23/10
[52] U.S. Cl. ........................... 123/298; 123/302; 123/305
[58] Field of Search .............................. 123/294, 295, 123/298, 302, 305

[56] References Cited

U.S. PATENT DOCUMENTS 4,920,937  5/1990  Sasaki et al. ............................ 123/305
5,259,348  11/1993 Kobayashi et al. .................. 123/305 X

*Primary Examiner*—Tony M. Argenbright
*Attorney, Agent, or Firm*—Knobbe, Martens, Olson & Bear LLP

[57] ABSTRACT

An internal combustion engine having a direct cylinder injection and including a variable valve timing mechanism for at least changing the time of closing of the intake valve. The fuel injection timing and intake valve closing timing are controlled so that under low and mid-range engine speeds, but high loads, the intake valve is closed before the piston reaches bottom dead center position on its intake stroke so as to reduce the effective compression ratio. Fuel injection timing is begun before the piston has reached its bottom dead center position during the intake stroke under high-speed, high-load conditions and is not initiated until after the piston has reached its bottom dead center position and begun its compression stroke under other engine running conditions. The engine is provided with an injector location and piston with a bowl in its head that improves fuel stratification under at least some running conditions so as to permit lean burn operation. The intake valves are offset to one side of a plane containing the axis of the cylinder bore, and the fuel injector is disposed between a pair of intake ports and below them so as to direct its injection axis toward the exhaust side and toward the recess in the head of the piston. A projection on the cylinder head surface prevents direct impingement of the fuel on the spark plug and also directs some of the injected fuel toward the exhaust valves to improve vaporization and exhaust valve cooling.

25 Claims, 16 Drawing Sheets

COMBUSTION CHAMBER

BACKGROUND OF THE INVENTION

This invention relates to a combustion chamber for an engine and more particularly for a direct cylinder injected engine.

In the search to obtain better engine performance while at the same time maintaining good fuel economy and exhaust emission control, direct cylinder injection has been proposed. However, there are several problems in connection with the use of direct cylinder injection, particularly with high-performance engines.

Obviously if the engine employs direct cylinder injection, it is then necessary to mount the fuel injector in the cylinder head along with the other components therein. Thus, if multi-valve engines are employed, there remains little area available for the fuel injector. The problem is further compounded by the manifolding and cylinder head flow passages required to obtain optimum performance.

Also, the orientation of fuel injection and its spray direction into the combustion chamber is important. Under some running conditions, particularly high-load, high-speed conditions, the injection should be such as to achieve a homogeneous mixture in the combustion chamber. On the other hand, under some running conditions, stratification may be desirable.

It is, therefore, a principal object of this invention to provide an improved combustion chamber and induction system for a direct cylinder fuel-injected engine.

It is a further object of this invention to provide a cylinder head arrangement for an engine that permits the use of multiple valves and direct cylinder fuel injection while maintaining the desired flow path from the fuel injector.

It is a still further object of this invention to provide an improved combustion chamber configuration for a direct injected internal combustion engine.

In conjunction with direct cylinder injected engines, it is also generally the practice to try to position the spark plug in or near to the geometric center of the combustion chamber. In order to position the fuel injector in a location wherein it can be easily serviced and will not interfere with the other components of the combustion chamber, it has been proposed to place the injector at a side of the chamber between the intake valves and so that it sprays generally toward the cylinder bore axis. Such an arrangement is shown in the copending application of one of the inventors herein entitled "Combustion Chamber and Induction System for Engine," Ser. No. 08/641,025, filed Apr. 29, 1996, and assigned to the assignee hereof.

That type of arrangement is particularly effective in achieving the desired results. However, the positioning of the injector is such that it tends to spray at least in part toward the spark gap. Thus, there is some possibility that the fuel spray may impinge upon the spark plug at a time when the plug is not being fired and to cause a deposit which could in effect cause fouling of the plug and misfiring.

It is, therefore, a still further object of this invention to provide an improved combustion chamber and induction system for a direct cylinder injected engine wherein the fuel injector can be positioned to a side of the combustion chamber and spray generally toward the cylinder bore axis without the likelihood of effecting spark plug fouling.

It is a further object of this invention to provide an improved combustion chamber and layout arrangement for a direct injected internal combustion engine.

Another problem that is potential with an arrangement of the type described in the aforenoted copending application, and in fact with all direct injected engines, is the likelihood of the high-pressure fuel impinging upon portions of the engine combustion chamber where the fuel will collect and not vaporize. This can cause obvious problems.

It is, therefore, a still further object of this invention to provide an improved fuel injection system and combustion chamber configuration wherein the depositing of fuel in the combustion chamber is avoided.

It is a further object of this invention to provide an improved combustion chamber arrangement for a direct injected engine wherein the fuel is sprayed toward a more highly heated portion of the combustion chamber so as to assist in vaporization and also assist in cooling of the combustion chamber.

SUMMARY OF THE INVENTION

The features of this invention are adapted to be embodied in a direct injected internal combustion engine having a cylinder block defining a cylinder bore, a piston reciprocating in the cylinder bore, and a cylinder head affixed to the cylinder block and closing the cylinder bore at one end of the piston. This structure forms a combustion chamber. A pair of intake valve seats are formed in the cylinder head, with their centers being positioned on one side of a plane containing the cylinder bore axis. A spark plug is mounted in the cylinder head, with its spark gap disposed contiguous to the cylinder bore axis. A fuel injector is mounted in the cylinder head between the intake valve seats and is disposed at an angle so as to spray toward the other side of the plane containing the cylinder bore axis from the centers of the intake valve seats.

In accordance with a first feature of the invention, the cylinder head is formed with a projection that is interposed between the spray axis of the fuel injector and the spark plug so as to preclude direct impingement of the fuel spray from the fuel injector on the spark plug gap.

In accordance with another feature of the invention, a pair of exhaust valve seats are formed in the cylinder head on the other side of the plane that contains the cylinder bore axis. A projection is formed on the cylinder head in the area between the fuel injector and the spark plug, and directs the fuel injected toward the exhaust valve seats for promoting fuel vaporization.

DETAILED DESCRIPTION OF THE PREFERRED EMBODIMENTS OF THE INVENTION

Figure 1:
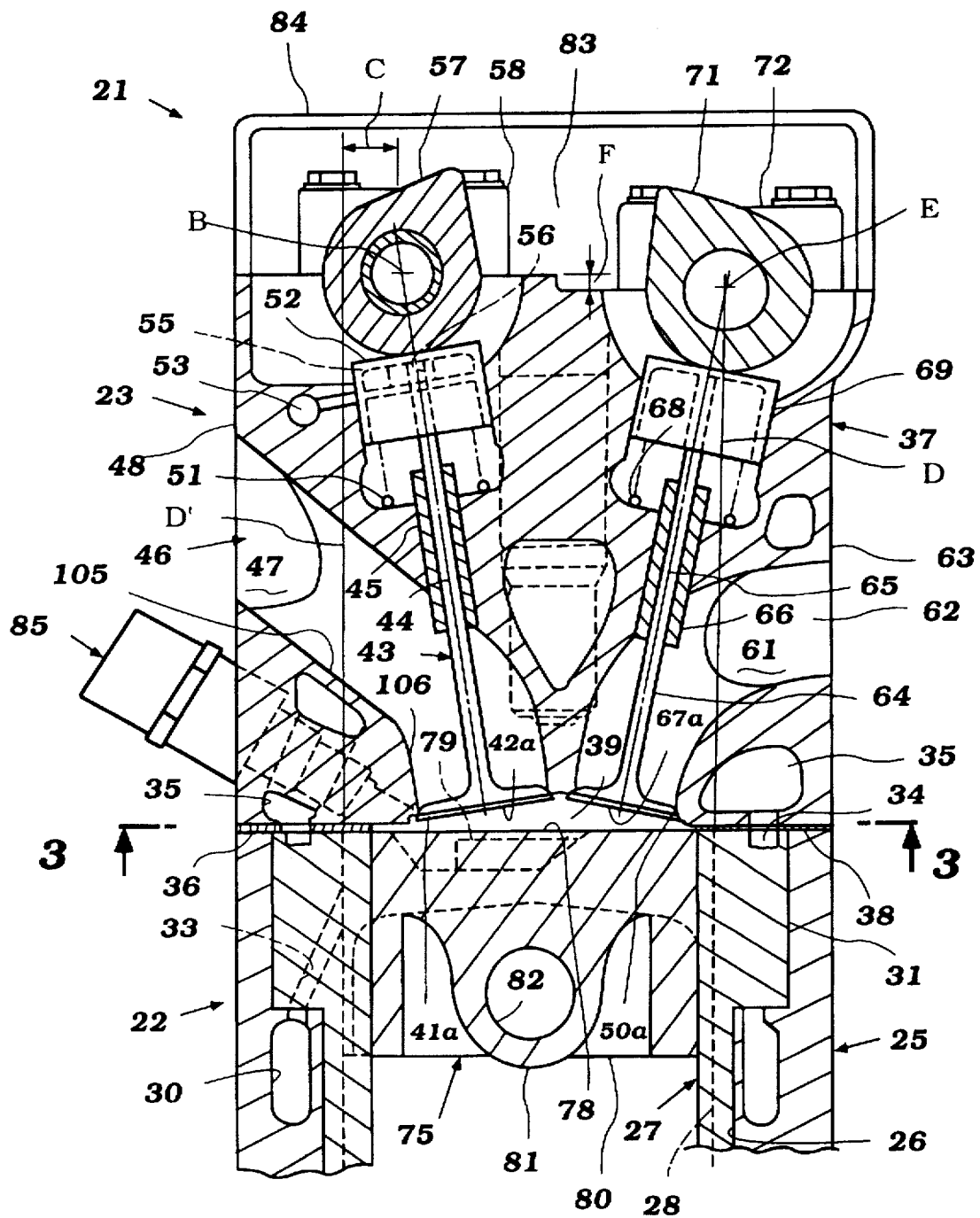
FIG. 1 is a partial cross-sectional view of an internal combustion engine constructed in accordance with an embodiment of the invention and taken generally along the line 1—1 of FIG. 3.
Figure 2:
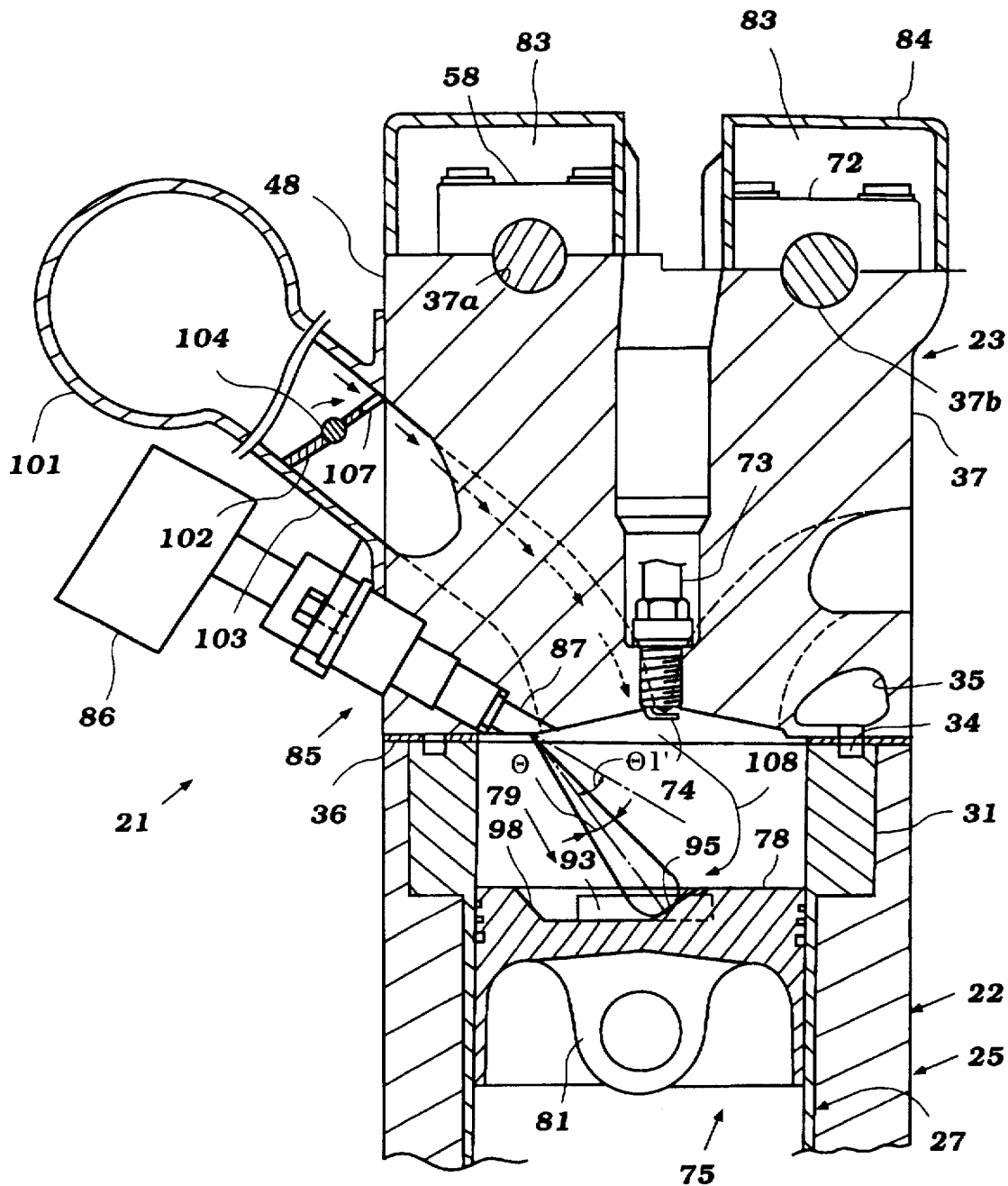
FIG. 2 is a partial cross-sectional view taken along the line 2—2 of FIG. 3.
Figure 3:
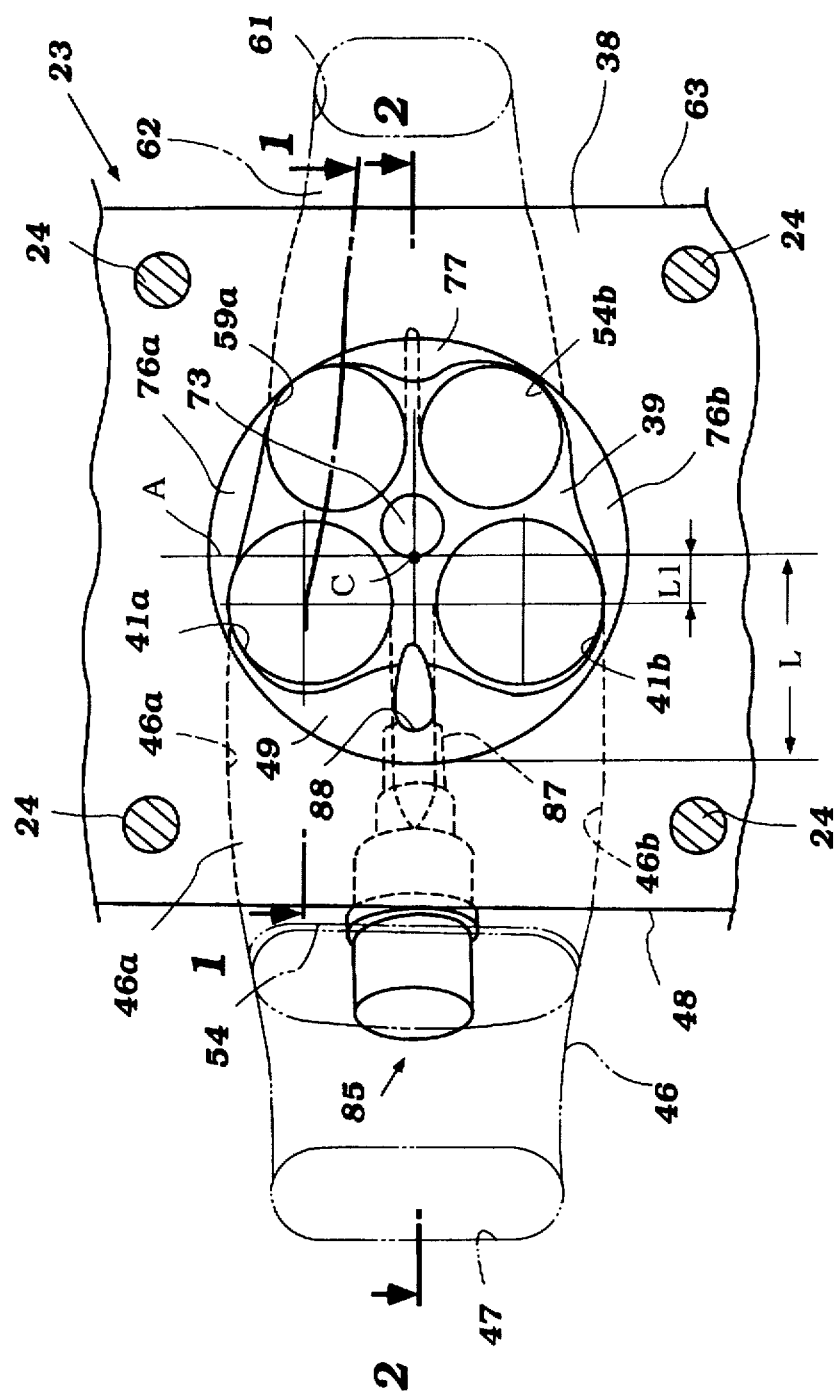
FIG. 3 is a cross-sectional view taken generally along the line 3—3 of FIG. 1 showing the underside of the cylinder head with certain components of the engine being shown in phantom.

Referring now in detail to the drawings and initially to FIGS. 1–3, a four-cycle, spark ignited, direct cylinder injected internal combustion engine constructed and operated in accordance with an embodiment of the invention is identified generally by the reference numeral 21. Only the cylinder head and upper portion of the cylinder block and piston are shown inasmuch as the invention deals primarily with the combustion chamber shape, the direct injection system and its location and their relation in the engine 21. Where any components of the engine 21 are not illustrated, any type of construction known in the art may be employed.

The engine 21 is comprised in primary part of a cylinder block assembly 22 to which a cylinder head assembly 23 is affixed by means which include a plurality of threaded fasteners 24 as seen in FIG. 3.

The cylinder block assembly 22 includes a main cylinder block casting 25 which is preferably formed from aluminum or aluminum alloy. This cylinder block casting 25 has a plurality of formed openings 26 which receive cylinder liners, indicated generally by the reference numeral 27 and which may be formed from a suitable material such as an iron or the like. It should be understood that although the invention is described in conjunction with a light alloy cylinder block casting in which iron liners are positioned, other forms of arrangement may be incorporated so as to form cylinder bores 28 of the engine.

Figure 6:
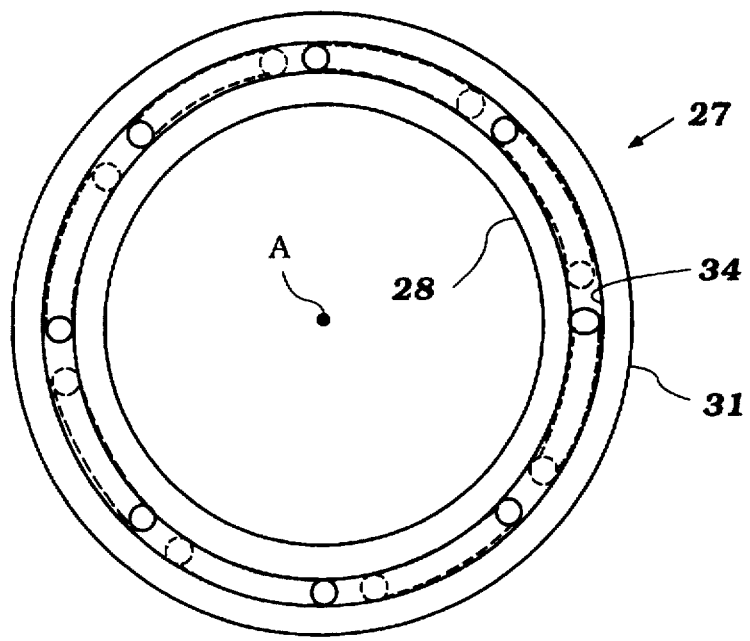
FIG. 6 is a top plan view showing the cylinder liner.
Figure 7:
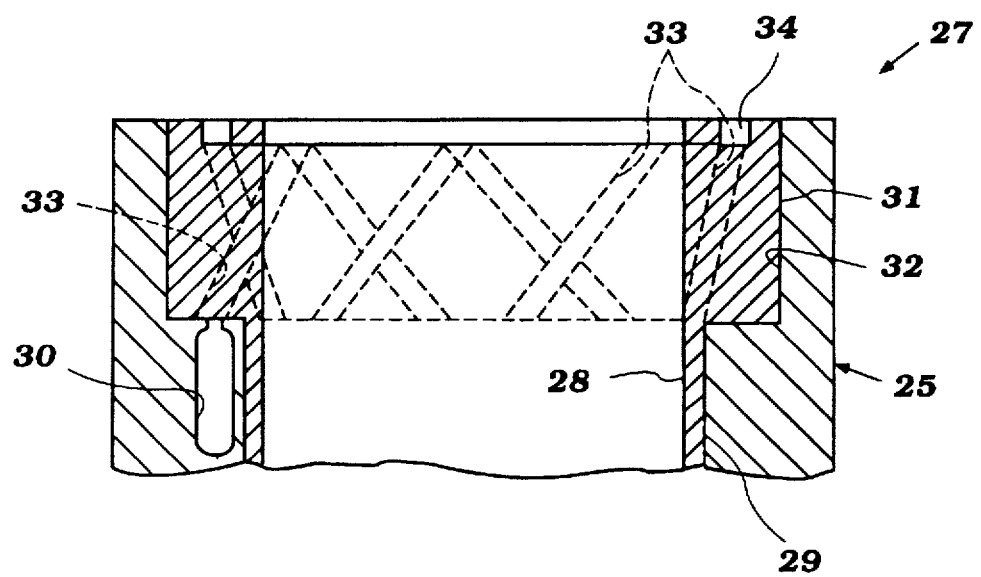
FIG. 7 is a cross-sectional view taken along a plane passing through the cylinder bore axis and showing how the water is exchanged between the cylinder block, cylinder liner and cylinder head.

As may be seen in FIGS. 6 and 7, the cylinder block openings 26 are juxtaposed to cooling water jacket portions 30 formed therein. The cylinder liners 27 have a first, thinner wall section 29 in which the major portion of the cylinder bores 28 are formed. An enlarged upper portion 31 of the cylinder liner 27 is received in a recess or counter bore 32 formed at the upper end of the cylinder block casting 25.

The enlarged portion 31 has a plurality of angularly disposed water passages 33 which extend from the cylinder block cooling jacket 30 upwardly toward the interface of the cylinder block assembly 22 with the cylinder head assembly 23. These passages 33 intersect a water channel 34 formed in the upper face of the liner portion 31 and which channel has a generally cylindrical extent. As a result, the upper portion of the cylinder liner 27 and specifically the enlarged portion 31 is formed with an additional cooling jacket so that this higher heated portion of the engine will be well cooled.

The cylinder head assembly 23 has, as best seen in FIGS. 1 and 2, a water jacket portion 35 which communicates with the cylinder block cooling jacket 30 through the annular water jacket channel 34 of the cylinder head. An interposed cylinder head gasket 36 has flow openings which permit the communication of the cylinder block and cylinder head cooling jackets 30 and 35 through the cooling arrangement formed in the upper end of the cylinder liner 27 as thus far described.

Continuing to refer to the construction of the cylinder head assembly 23 by primary reference to FIGS. 1–3, it will be seen that the cylinder head assembly is comprised of a main cylinder head casting 37 having a lower face 38 that engages the sealing gasket 36. A recess 39 is formed in this lower face in juxtaposition to an overlying relationship with the cylinder bore 28. It will be seen that the cylinder head recess 39 is disposed relative to the axis of the cylinder bore 28 which axis is indicated by the reference characters C in FIG. 3 so as to be slightly offset toward one side thereof.

It should be noted that only a single cylinder bore 28 and cylinder head recess 39 have been depicted. This is because it is believed readily apparent to those skilled in the art how the invention can be practiced with engines having any number of cylinders and any cylinder configuration. Therefore, only the single cylinder application is being described and those skilled in the art will readily understand how the invention may be employed with multi-cylinder engines of any configuration.

The recess 39 is provided with a pair of intake valve seats 41a and 41b which are disposed in substantial part on one side of a plane A containing the cylinder bore axis C and the axis of rotation of the engine crankshaft. However these valve seats 41a and 41b extend in part over the plane A for a reason which will become apparent. The centers of the valve seats 41 lie on a plane that is parallel to the plane A and which plane is offset from the plane A by a distance L1. The distance L1 is preferably less than ¼ of the radius of the cylinder bore 28.

Each intake valve seat 41a and 41b is valved by the respective head 42a and 42b of a respective intake valve, indicated generally by the reference numeral 43. Each intake valve 43 has a stem portion 44 that is slidably supported in the cylinder head casting 37 by an intake valve guide 45 that is pressed or otherwise fixed therein. The reciprocal axes of the intake valves 43 lie in a common plane that is disposed at an acute angle to the plane A.

The intake valve seats 41a and 41b are formed at the discharge end of a Siamese-type intake passage, indicated generally by the reference numeral 46 and which has a common inlet portion 47 that extends through an outer side surface 48 of the cylinder head casting 37. An appropriate intake manifold and/or throttle body, air cleaner/air filter assembly is affixed to the side surface 48 of the cylinder head casting 37 for delivering an air charge to the intake passage 46. A specific portion of such an assembly will be described later by reference to FIG. 2.

The intake passage 46 branches into a pair of branch sections 46a and 46b to form a Siamese intake passage that serves the valve seats 41a and 41b, respectively. The shape of these branch sections is significant and will be described in more detail later.

It will be seen that the offsetting of the recess 39 toward the opposite side of the plane A provides a relatively large squish area 49 on the intake side of the engine. This squish action will be utilized, in a manner described, so as to provide the desired flow pattern and stratification in the combustion chamber.

The intake valves 43 are urged to their closed positions by means of coil compression springs 51 (FIG. 1) which act against tappet-type actuators 52. These tappet-type actuators 52 incorporate a mechanism for varying the lift of the individual intake valves 43. This variable lift mechanism is of the type shown in the copending application entitled "Valve Actuating Structure For Multi-Valve Engine", Ser. No. 08/521,055, filed Aug. 29, 1995, now abandoned in the names of Hiroyuki Tsuzuku et al and assigned to the assignee hereof the disclosure of which is incorporated herein by reference.

Basically, the valve timing mechanism is actuated by a hydraulic circuit that includes a delivery conduit 53 and which pressurizes a chamber 54 to act upon a slide member 55 against a spring biased element 56 so as to control the amount of lift of the valves 43. The strategy for changing the lift will be described later.

The intake valves 43 are disposed so that the aforenoted plane containing their reciprocal axes intersects a line B which is the center or axis of rotation of an intake cam shaft 57. This intake cam shaft 57 is journaled in the cylinder head assembly 23 by means that include a bearing cap 58 and integral bearing surfaces 37a formed by the cylinder head casting 37.

The intake cam shaft 57 is driven from the crankshaft of the engine through a mechanism which includes a variable valve timing mechanism of any known type. This variable valve timing mechanism is employed, as will be described, so as to control the timing of closing of the intake valves 43. This coupled with the variable lift mechanism permits the performance of the engine to be significantly improved at low- and mid-range ends without sacrificing maximum power output, as will also be described.

It should be noted that the axis of rotation B of the intake cam shaft 57 is disposed inwardly a distance C from the outer peripheral edge of the cylinder bore 28 as best seen in FIG. 1. However, a portion of the periphery of the intake cam shaft 57 extends beyond the cylinder bore periphery which is indicated by the line D in FIG. 1.

Disposed on the opposite side of the plane A from the main portion of the intake valve seats 41a and 41b are a pair of smaller diameter exhaust valve seats 59a and 59b. These exhaust valve seats 59a and 59b are disposed at the beginning of exhaust passages indicated generally by the reference numeral 61 which are formed in the cylinder head casting 37 on the side opposite the intake passages 46. These exhaust passages 61 like the intake passages are Siamesed and terminate in a common outlet 62 formed in the respective cylinder head outer surface 63. An appropriate exhaust manifold (not shown) collects the exhaust gases from the exhaust passages 61 and delivers them to a suitable exhaust system for discharge to the atmosphere.

The exhaust valves 64 have stem portions 65 that are slidably supported in exhaust valve guides 66 which are pressed or cast into the cylinder head casting 37. Like the intake valves, these axes lie in a common plane disposed at an acute angle, but on the opposite side of the plane A. These acute angles are not the same. In a preferred embodiment the angle of the intake valves 43 is less than that of the exhaust valves. These exhaust valves 64 have respective head portions 67a and 67b that cooperate with the valve seats 59a and 59b for controlling the flow therethrough.

The exhaust valves 64 are urged to their closed positions by means of coil compression springs 68 which act against the cylinder head and keeper retainer assemblies (not shown). Exhaust valve actuating tappets 69 are slidably supported in the cylinder head and are associated with the exhaust valve 64 for opening them.

The exhaust valves 64 have their reciprocal axis lying in a plane that intersects a point E which defines the axis of rotation of an exhaust cam shaft 71. The exhaust cam shaft 71 is journaled in the cylinder head by means that include bearing caps 72 affixed to the cylinder head in a known manner and by integral bearing surfaces 37b formed in the cylinder head casting 37. The axis E lies on the peripheral edge D of an extension of the cylinder bore 68.

The exhaust cam shaft 71 is driven through a suitable drive at one-half crankshaft speed which drive may also be the same drive that drives the intake cam shaft 57. However, in a preferred embodiment of the invention, there is no variable valve timing control for the events of the exhaust valves 64. However, and if desired, such a mechanism may in fact be incorporated.

In addition, there is no variable lift mechanism and hence the surface of the cylinder head on which the intake cam shaft 57 is journaled is slightly higher as indicated by the dimension F than the surface that supports the exhaust cam shaft 71. Thus, the rotational axis B of the intake cam shaft 57 is at a distance F above the rotational axis E of the exhaust cam shaft 71.

A spark plug, indicated by the reference numeral 73 is mounted in the cylinder had so that its gap 74 is disposed generally toward the center of the combustion chamber recess 39 and thus is offset slightly from but still juxtaposed to the cylinder bore axis C as best seen in FIG. 3. The spark plug 73 is fired by a suitable ignition system.

Pistons, indicated generally by the reference numeral 75 are slidably supported within the cylinder bores 28 and cooperate with the cylinder head recesses 39 and the lower surface 38 of the cylinder head assembly 23 to form the combustion chambers of the engine. It should be noted that the recess 39 is also set in from the cylinder bore 28 on the exhaust side of the engine to provide side squish areas 76 and also a small squish area 77 on the outer peripheral edge of the exhaust valve seats 59a and 59b. The side squish areas are larger than the end squish area 77. The squish area 77 is substantially smaller than the squish area 49 on the intake side so that the squish flow will predominate from the intake side to the exhaust side of the combustion chamber, as will also be described. Also the squish areas 76a and 76b may be of different effective area to assist in swirl generation, as will be noted later.

The pistons 75 are provided with head portions 78 in which recesses or bowls 79 of a configuration and shape which will be described later are formed. Skirt portions 80 of the pistons 75 slidably engage the cylinder bores 27 and piston rings (not shown) are formed in the head portion 78 for sealing purposes.

The skirt portions 80 are formed with bosses 81 that have openings 82 for receiving piston pins to provide a pivotal connection to the upper or small end of a connecting rod (not shown). For the reasons aforenoted, the description of the lower portion of the engine including the connection of the connecting rods to the aforenoted crankshaft have not been disclosed and any conventional arrangement may be employed.

The valve actuating mechanism already described is contained within a valve actuating chamber 83 formed at the upper end of the cylinder head assembly 23 and which is closed by a cam cover 84 in a known manner.

In accordance with an important feature of the invention, the engine is provided with a direct cylinder fuel injection system and this includes a fuel injector, indicated generally by the reference numeral 85, for each cylinder, and which is mounted on the intake side of the engine. The fuel injector 85 may be of the electrically controlled type and is associated with a fuel rail 86 for delivery of the fuel to the injectors 85 in a known manner. It will be seen that the fuel injector 85 is disposed between and generally below the intake passages 46.

Figure 5:
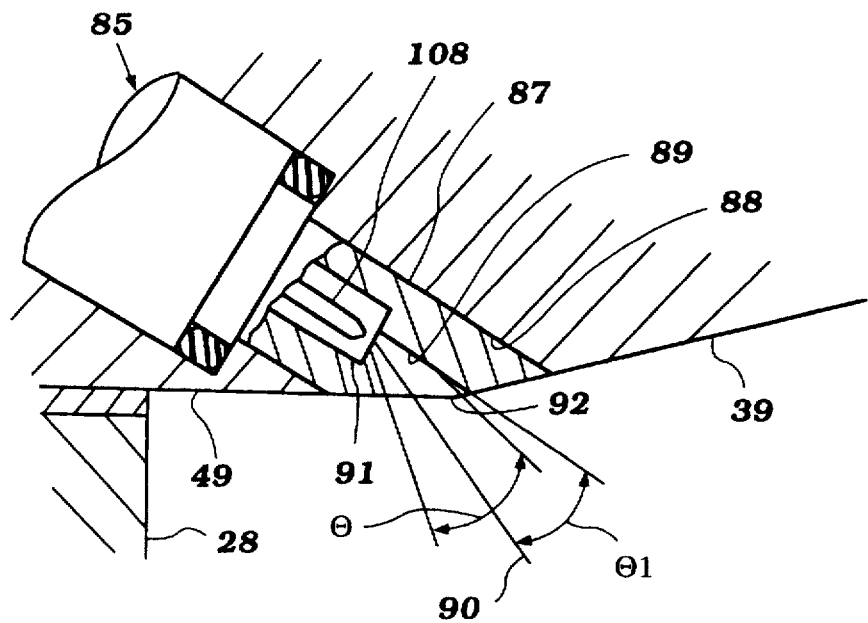
FIG. 5 is an enlarged view of the area showing the end of the injector nozzle and its relative disposition to the cylinder head combustion chamber recess.

The injector 85 has a discharge nozzle portion the construction of which is best seen in FIG. 5. This discharge nozzle portion includes a cylindrical part 87 that is received in a bore 88 in the cylinder head casting 37 and which is disposed in the area between the intake valve seats 41a and 41b. This point is at the peripheral edge of the squish area 49 as best seen in FIG. 3.

The discharge nozzle portion 87 is formed with a first conical part 89 that is disposed so as to have an axis 90 about which the spray pattern forms a conical shape as seen by the angle θ in FIG. 5. The lower part of the discharge nozzle portion 87 has a surface 91 which is generally in line with the squish surface 49. In addition, the upper peripheral edge of the discharge nozzle portion 87 is also formed with a relief area 92 which is somewhat conical in shape but which extends from an area θ1 from the center axis 89 so as to direct a portion of the fuel spray in a generally upward direction toward the spark gap 74 under conditions which will be described.

Like the firing of the spark plug 90 the timing of the fuel injector 84 is controlled by an ECU. There is a specific control strategy associated with the operation, and that control strategy will be described later.

Figure 4:
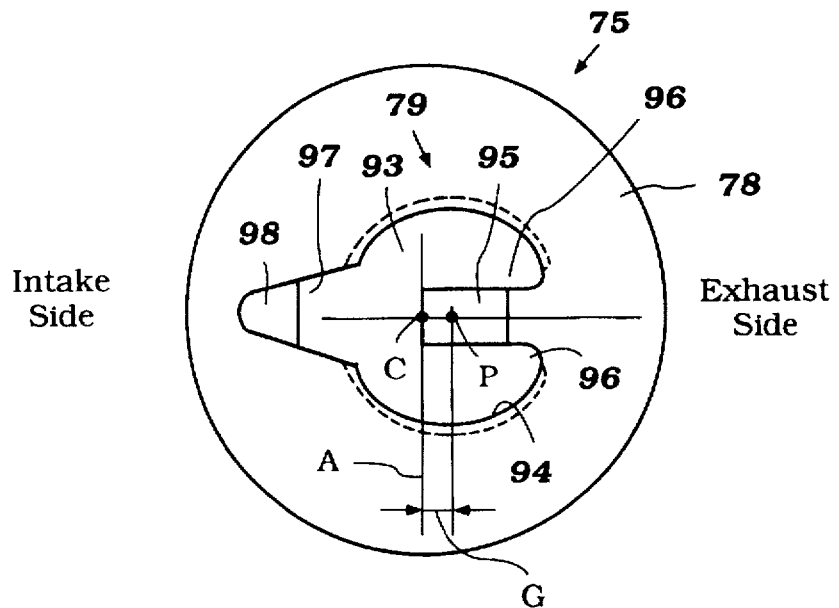
FIG. 4 is an enlarged top plan view of the piston head showing the configuration of the bowl in the head.

The configuration of the recess 79 in the piston head 85 will now be described by primary reference to FIGS. 2 and 4. However, FIG. 3 should also be referred to understand how the recess 79 is configured relative to the discharge path of fuel from the fuel injector 85. First, the recess 79 is comprised of a generally cylindrical center bowl portion 93 which has a slightly larger diameter at its base than the somewhat restricted throat portion 94 formed at its upper end. The lower surface of the bowl 93 is generally flat.

The center of the bowl 93 and throat 94 lies at a point P that is offset a distance G from the cylinder bore axis C on the exhaust side. Disposed centrally in this bowl 93 and on a plane perpendicular to the plane A and passing through the cylinder bore axis C is an upstanding projection 95 that has a generally angularly inclined surface extending from the upper part of the head 78 and downwardly into the bowl 93 so as to merge into the flat lower surface of the bowl 93 on the cylinder bore axis C. This projection defines a pair of recesses 96 which are formed on its opposite sides and which are formed primarily by the shape of the bowl 93 and the throat 94.

Disposed in opposition to the projection 95 is an entry recess 97 which is carved out of the intake side of the piston entering into the bowl 93 in an outwardly tapering fashion. An inclined ramp 98 extends down to the lower wall of the bowl 93 in the cutout or entry recess 97. This configuration is shaped so as to be complementary to the spray pattern from the injector 85 when the piston is in a top dead center position, as will be described later.

It has been previously noted that an intake manifold is attached to the surface 48 of the cylinder head. Although any conventional type of intake manifold may be employed, FIG. 2 shows an intake manifold, indicated generally by the reference numeral 101, which is configured so as to accommodate a tumble valve 102 in each runner section 103 that extends to each intake passage 46. The tumble valves 102 for all cylinders in the same bank are mounted on a common tumble valve shaft 104.

As should be readily apparent from FIG. 1, each intake passage portion 46a and 46b is formed with a steeply inclined lower wall 105 that extends to a curved section 106 that terminates at the respective valve seats 42a and 42b. Hence, the flow into the combustion chamber will tend to be directed toward an axial direction under wide-open throttle unrestricted flow. In addition this opens a space below the intake passage 46 to accommodate the fuel injector 85 in a position so that its spray axis is generally parallel to the flow axis of the passage portions 105.

However, the tumble valve 102 is provided with a cutout 107 on its upper surface so that when the tumble valve 102 is in a flow-redirecting position as shown in FIG. 2, the intake air charge will be directed primarily toward the opposite side of the cylinder bore 28 so as to create a weak tumble action, indicated by the arrow 108 in FIG. 2. This is utilized, in a manner which will be described, so as to improve engine running and stratification under certain running conditions.

The characteristics of the spray from the fuel injectors 85 in connection with their actuating timing pulses will now be described by reference to FIG. 8 although FIG. 5 will also be referred to. As may be seen in FIG. 5, each injector nozzle has an injector valve 108 which controls the flow through its respective spray orifice. The injector valve 108 is operated by a trigger pulse that is transmitted from the ECU of the system to a solenoid for operating the valve 108 to its opened position. When the solenoid winding is de-energized, a coil compression spring will return the injector valve 108 to its closed position.

Figure 8:
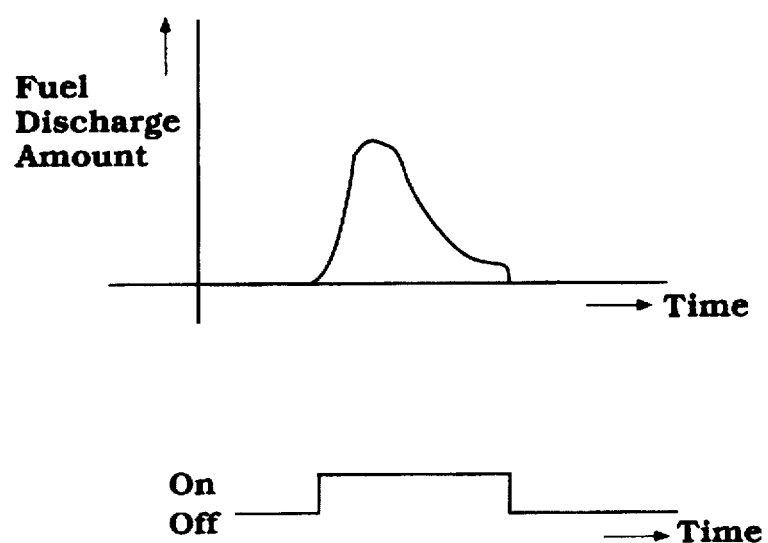
FIG. 8 is a graphical view showing the fuel injector actuating signal and fuel injection amount with respect to time.

The lower portion of FIG. 8 shows the actual control characteristics. As may be seen, the triggering pulse is either "on" or "off". When the solenoid is energized by turning this pulse "on", the injector valve 108 will open and after some delay a large amount of the total fuel injected will begin to flow. This fuel flow builds up to a peak shortly after the time of opening and then falls off until the time of closing. Hence, the system operates in such a manner so as to use this predominantly front end loaded fuel flow to obtain the optimum performance of the engine.

Again, and before referring to the actual control strategy, the components which are associated with the control will be described later. The engine control strategy is dictated primarily by engine running speed and engine load. Of course, additional parameters may be employed in the actual fine-tuning of the system. However, the features important here dealing with the fuel injection timing and not necessarily duration and valve timing and particularly the valve timing of the closing of the intake valves 43 is what forms an important part of the subject matter.

The engine is provided with an engine speed detector of any known type. This may constitute a pulser coil associated with the crankshaft of the engine or any other rotating shaft that rotates simultaneously with the crankshaft. In addition, a load detector such as a throttle valve position sensor associated with the main throttle valve of the engine preferably is incorporated. Other types of load sensing arrangements may be employed.

The outputs of both the engine speed detector and the load detector are transmitted to an ECU (not shown). This ECU has embodied within it a valve timing change control section and an injection timing control section. Both the valve timing section and the injection timing section receive both the speed and load output signals.

The timing change control section outputs its control signals to the aforenoted variable valve timing mechanism so as to control the timing of the opening and closing of the intake valves 43. As has been noted, the intake valves are operated in such a way that their opening is not significantly changed while their closing does significantly change. In a similar manner, the injection timing control section outputs a signal to the fuel injectors 85 so as to control the timing and duration of their fuel injection. Like the valve timing mechanism, the invention in this case deals primarily with the timing of the fuel injection rather than the control for the injection amount. The injection amount can be determined by any suitable strategy, but in accordance with the invention the timing of the beginning of fuel injection in relation to piston position during the stroke is a significant feature of the invention. This will now be described by particular reference to FIGS. 9 through 13.

For the most part, under normal running conditions, the control strategy may be conventional. The control strategy employed is particularly important when operating under high load conditions at low- and mid-range speeds and also in the transition from this running condition to the normal running condition. Basically, the way the strategy operates is that when running under low-speed/high-load conditions, the intake valve closing is advanced from its normal advance characteristic which is employed under all other engine load and speed conditions. In a like manner, when operating under mid and high speed/high-load conditions, the fuel injection timing is begun earlier than under other running conditions.

Figure 9:
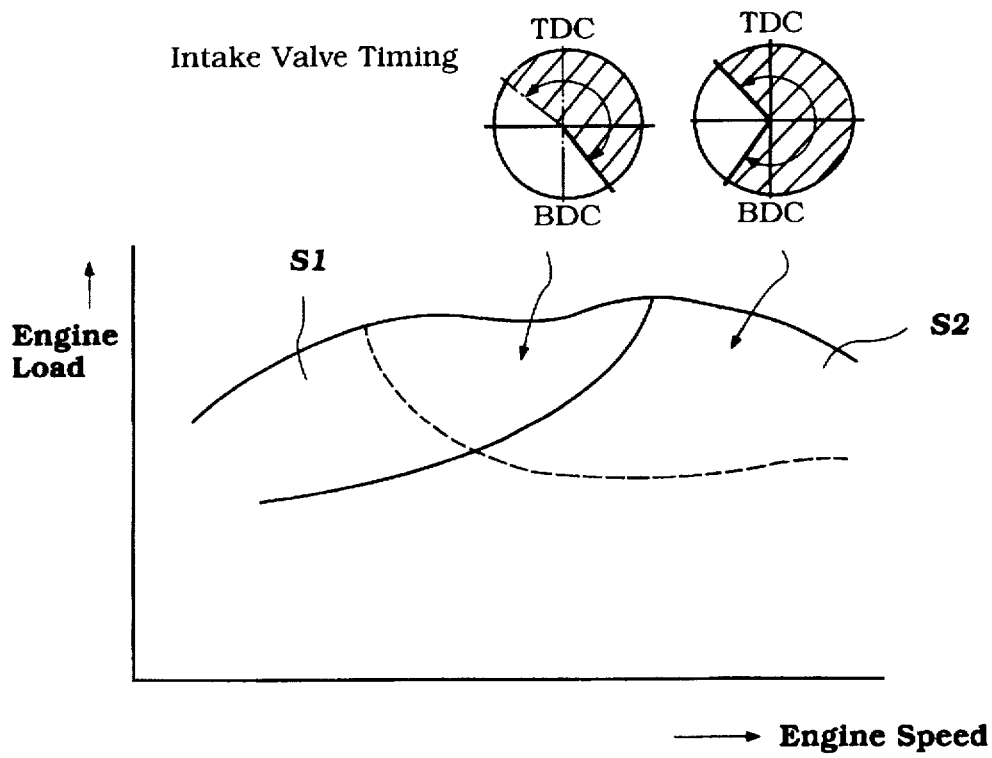
FIG. 9 is a graphical view showing the engine torque curve with relation to engine speed and engine load in relation to intake valve timing in accordance with an embodiment of the invention.

As may be seen from FIG. 9, the region S1 shows the domain when the engine load is high and the engine speed is in the low/mid-range conditions. Under this condition, the ECU and specifically its valve timing control section operates so as to cause the closing of the intake valves 43 to be advanced so that the intake valves will close before bottom dead center condition on the intake stroke as shown by the upper left-hand view of FIG. 9. Thus the compression ratio will be effectively lowered.

Figure 10:
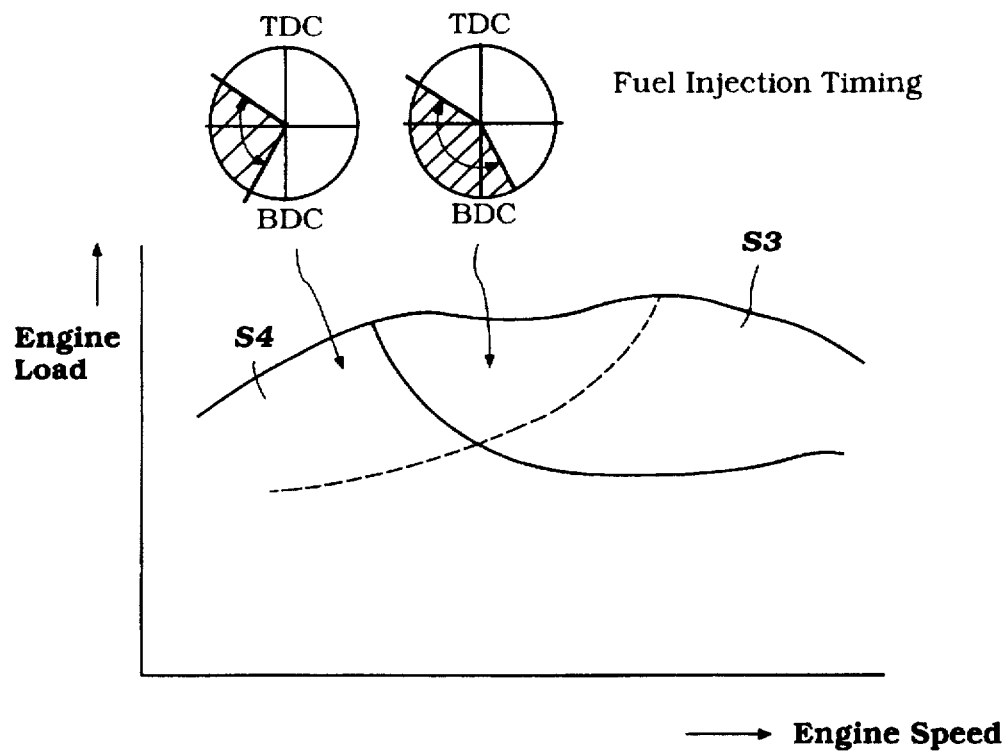
FIG. 10 is a graphical view, in part similar to FIG. 9, and shows the fuel injection timing under the same conditions.

During the lower speed portion of this running condition and in the domain indicated S4 in FIG. 10 the normal fuel injection strategy is employed. That is fuel injection begins after the piston 75 has passed bottom dead center and during the compression stroke.

When the engine speed reaches mid range as shown in FIG. 10 in the control area S3, the fuel injection timing is advanced by providing an advance signal from the control section to the fuel injector 85 so as to begin fuel injection before bottom dead center. This is advanced over the normal fuel injection timing, and the amount of fuel injection advanced so as to provide better running and better performance under this condition. During the initial phase of this condition the intake valve opening is still advanced as in the control range S1 of FIG. 9.

If the engine load continues to be high as the speed increases to the high range side, then the system moves to the control domain shown at S2 in FIGS. 9 and remains in the range S3 in FIG. 10. Under these conditions the valve timing for opening and closing of the intake valves 43 is returned to normal and the advanced fuel injection timing is also maintained. As a result, the intake valve will close after bottom dead center position of the intake stroke and injection will occur before the time when the intake valves close. Thus, good engine performance will result.

Figure 11:
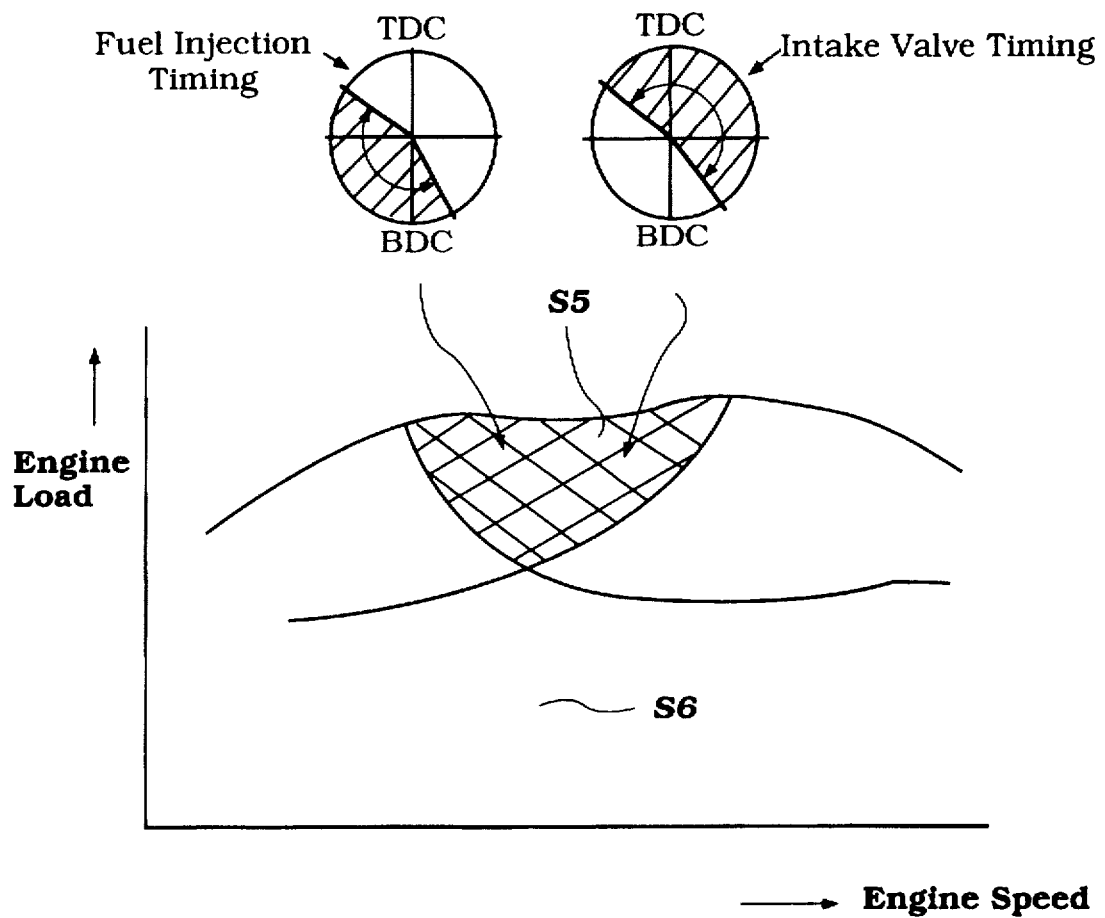
FIG. 11 is a graphical view, in part similar to FIGS. 9 and 10, and shows another phase of the control routine including both injection and valve timing.

FIG. 11 shows the mid-range domain in the section indicated at S5 where the engine speed is relatively high, but the load is also maintained high. Under this condition, like the low-speed, high-load condition, the intake valve timing is set as shown on the right-hand upper view of this figure so as to close the intake valve before bottom dead center on the intake stroke and thus reduce the effective compression ratio by throttling the amount of air that is inducted. At the same time, the injection timing is advanced so as to begin before bottom dead center on the intake stroke and about the time when the intake valve closes so as to provide good running under this condition.

Figure 12:
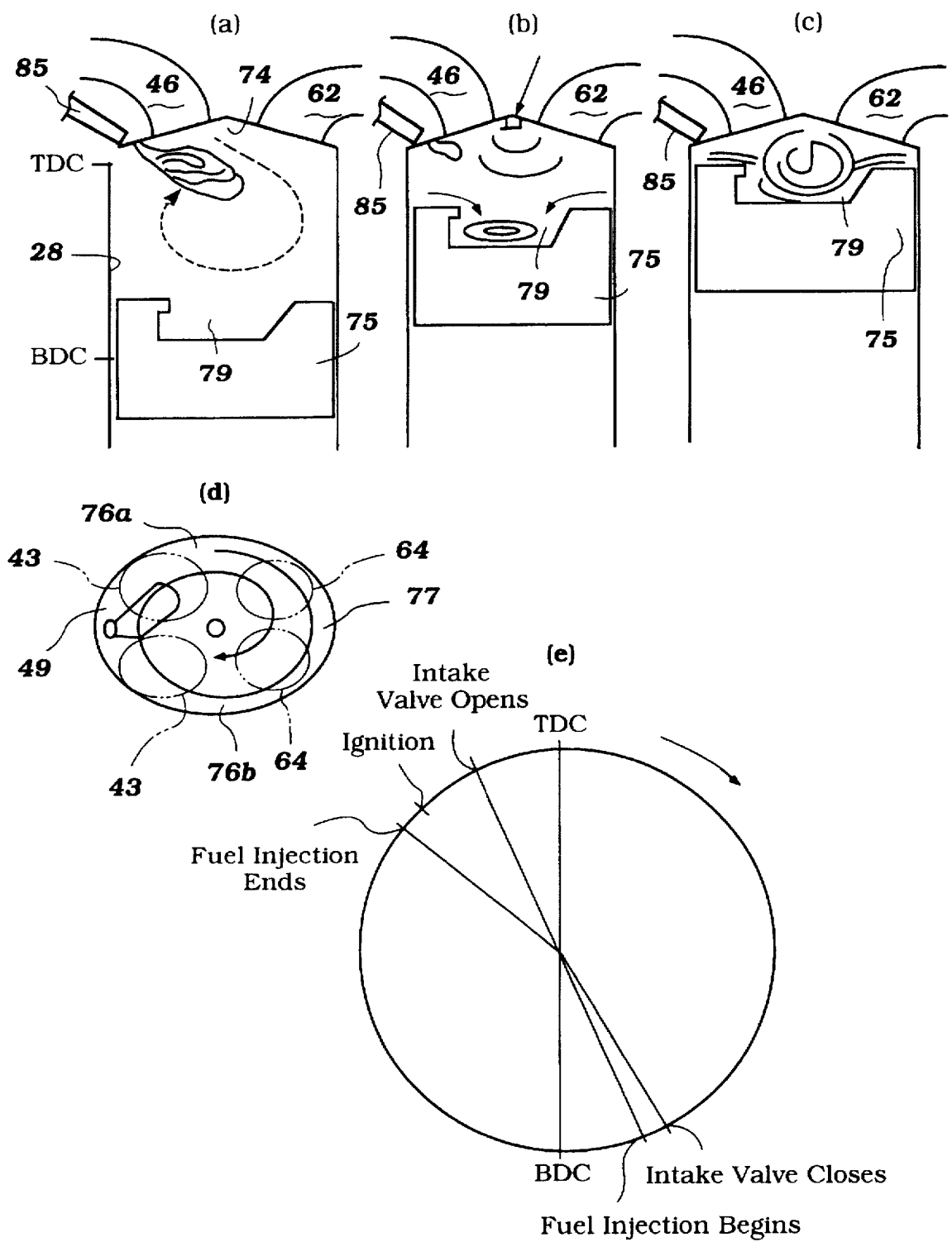
FIG. 12 is a multi-part view showing across the top the air and fuel flow in the combustion chamber under one running condition. The center view shows the top plan view of the condition in the top figures while the bottom view shows the timing of injection and intake valve and spark firing events.
Figure 13:
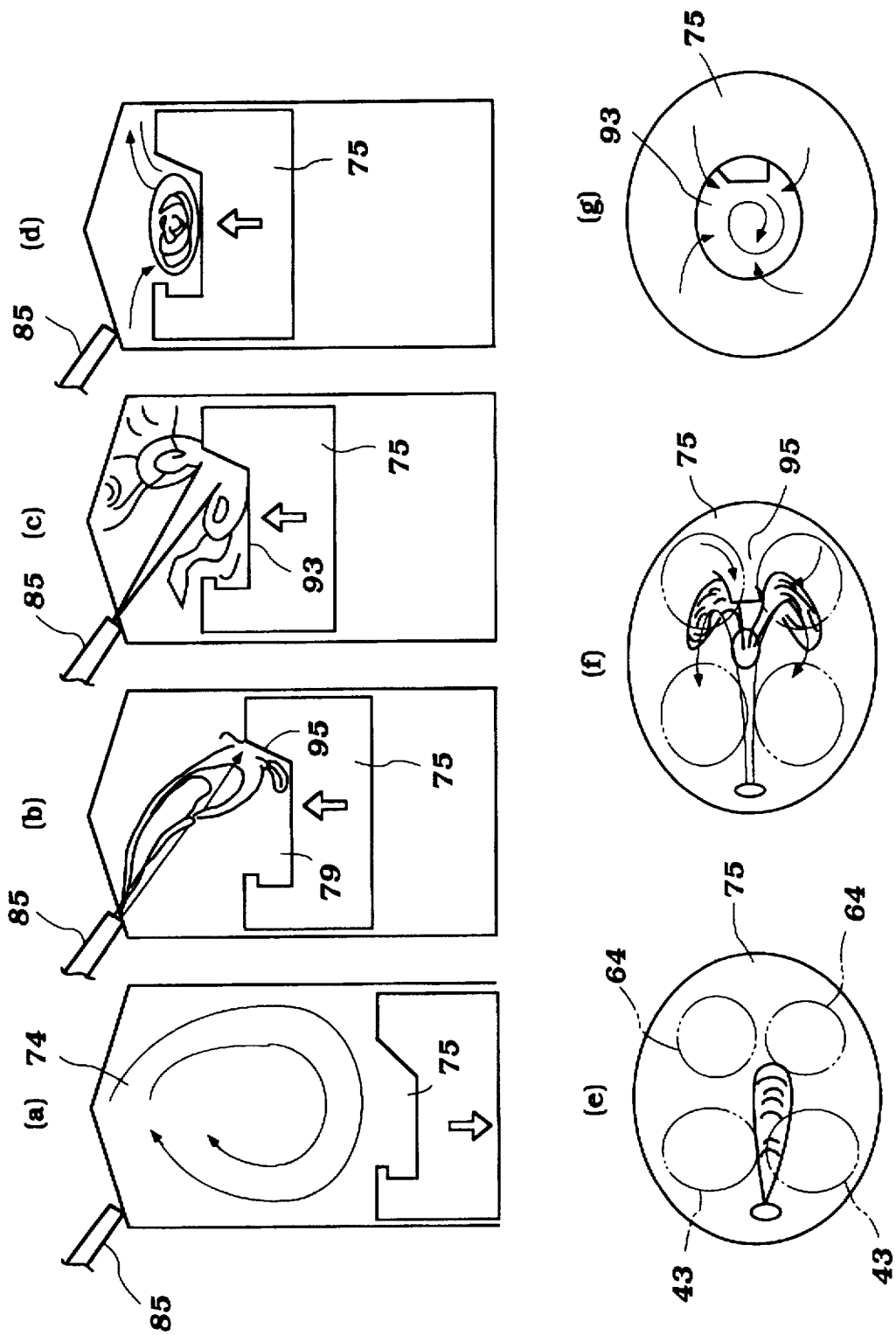
FIG. 13 is a multi-part view, in part similar to FIG. 12, and shows the conditions under another engine running condition.

When this occurs, the situation is as shown in FIG. 12 of the drawings. It may be seen from these figures that the injection timing and intake valve timing is such so as to maintain a homogenous mixture in the combustion chamber that is stoichiometric, and hence will provide the necessary power for the load. As may be seen, the intake valve closes before bottom dead center, and shortly thereafter fuel is injected, as shown in FIG. 12a. Under this condition there is a relatively weak tumble that occurs in the combustion chamber, as shown by the dotted-line view.

This tumble is relatively weak because of the fact that the tumble control valve 102 is substantially opened, and hence the charge from the intake valve seats 41a and 41b is in a generally axial direction. However, because of the offsetting of the intake valves so they somewhat overlie the plane A, as seen in FIG. 3, this slight tumble action will occur. Fuel is injected during the continued downward stroke of the piston 75, and as the piston 75 moves upwardly, a squish action will occur from the squish areas, indicated previously in FIG. 3.

As has been noted, the intake side squish area 49 is larger than the exhaust side squish area. Also, one side squish area 76b is larger than the other side squish area 76a, and hence there will be some slight swirl generated, as shown in FIG. 12d. The charge of fuel will tend to be delivered into the piston recess 79 under this condition, and hence the fuel will tend to accumulate in this area during the continued upward movement of the piston.

As the piston reaches top dead center, however, the fuel in the recess 79 will expand because of the heat of the piston head and move upwardly into proximity with the gap 74 of the spark plug 73. Hence, when the spark plug is fired at the time shown in FIG. 12e, there will be a homogeneous mixture present, and good and complete combustion will occur.

The remaining control range for the engine is shown by the portion indicated at S6 in FIG. 11, and this is the area below the load ranges where the transition occurs between what is regarded as a high load and low load for engine running. Under this condition the tumble valve 102 is rotated to the position shown in FIG. 2 so as to generate a more significant and pronounced tumble in the combustion chamber. Also, at this same time normal valve timing and injection timing are employed. Hence, the combustion and flow characteristics are such that good stratification will occur, as may be understood by reference to FIG. 13.

FIG. 13a shows the condition as the piston has reached bottom dead center. The open intake valves 43 and the action of the tumble valve 102 will cause a relatively strong tumble action, as shown by the arrows. When the piston 75 approaches top dead center position, the fuel injector 85 is activated so that fuel spray begins. At this time the piston head projection 95, which extends into the cavity 79, will be disposed so that the fuel will strike it. A portion of the fuel then tends to flow down into the bowl 93 and another portion flows up toward the spark plug 73, and specifically its gap 74. The restricted throat area 94 will tend to retard some of this upward flow.

As the piston continues to move toward top dead center, the squish action will tend to concentrate the rich fuel/air mixture in the center of the piston recess 93. As may be seen in FIG. 13f, the projection 95 tends to cause the fuel sprays to flow back in the cavity 93. Also, the squish action, as shown in FIG. 13g, will tend to confine the fuel in this area. Thus, as seen in FIG. 13e, there is a good stratification achieved.

As the piston approaches top dead center position, firing of the spark plug 73 will occur when there is a stoichiometric mixture present at the gap 74, and thus combustion can be initiated. Thus, the engine can operate on this cycle as a lean burn type of arrangement without adverse performance.

Figure 14:
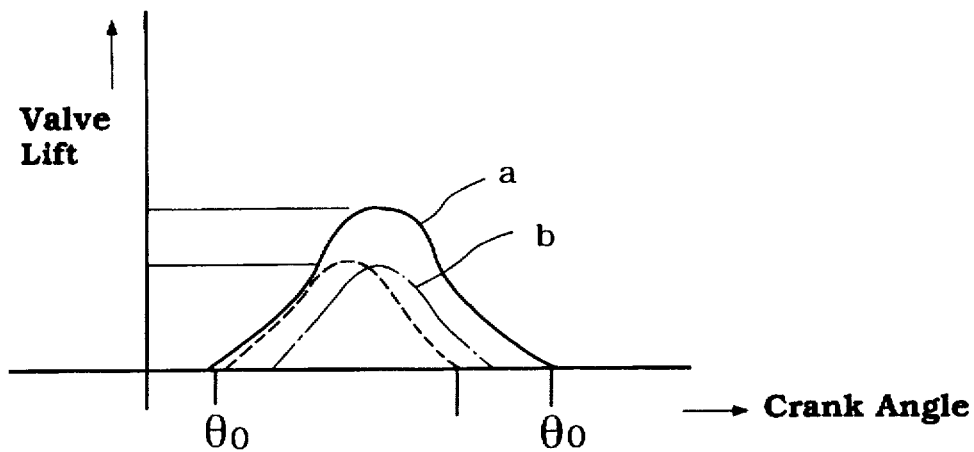
FIG. 14 is a graphical view showing how the valve lift and timing can be altered to practice the invention.

As has been noted, the variable valve timing mechanism coupled with the variable valve lift are effective, as shown in FIG. 14, to provide an arrangement wherein the closing time of the valve can be varied rather significantly, regardless of the lift employed, whereas the variation in change in opening times is not particularly great. As seen in the solid line view (a) of this figure, when maximum lift is employed, as under normal running, the intake valves open at the crankshaft angle $\theta_0$ and close at the angle $\theta_c$. If the valve timing is not changed but the lift is reduced using the lift control mechanism the opening and closing timings are both changed. The opening and closing are both delayed. But if, at the time the timing is shifted to the advance side the lift is also reduced, the curve b results. Thus opening timing is maintained constant but closing time is substantially advanced. Thus a preferred embodiment reduces lift at the same time as valve timing is advanced. That is, the variable valve timing mechanism is effective so as to advance the opening under low lift to the normal value. The closing can then be advanced without significantly changing the opening time.

Figure 15:
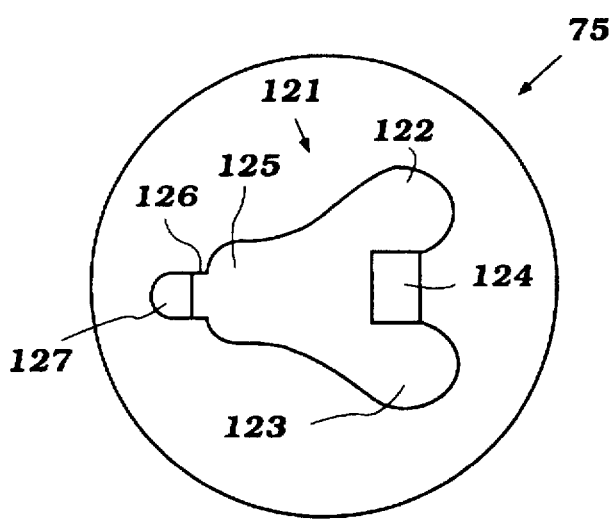
FIG. 15 is a top plan view, in part similar to FIG. 4, and shows another embodiment of the invention.

FIG. 15 shows another configuration which may be utilized for the recess in the head of the piston 75 and in all other regards is the same as the embodiment previously described. In this embodiment the piston 75 is provided with a recess 121 that is comprised of a pair of portions 122 and 123 that have a generally cylindrical configuration but which are separated by an inclined wall 124 formed by a projection similar to the projection 95 of the previous embodiment. The portions 122 and 123 merge into a further semi-elliptical bowl-shaped portion 125 formed at the base of an inlet channel 126. The inlet channel 126 has an inclined surface 127 that corresponds to the surface 98 of the previously described embodiment. With this embodiment the bowl 121 has about the same volume as the previous arrangement, but has a somewhat greater surface area. In all other regards, the construction and operation of this embodiment is the same, and it has the same beneficial effects as those previously described.

Figure 16:
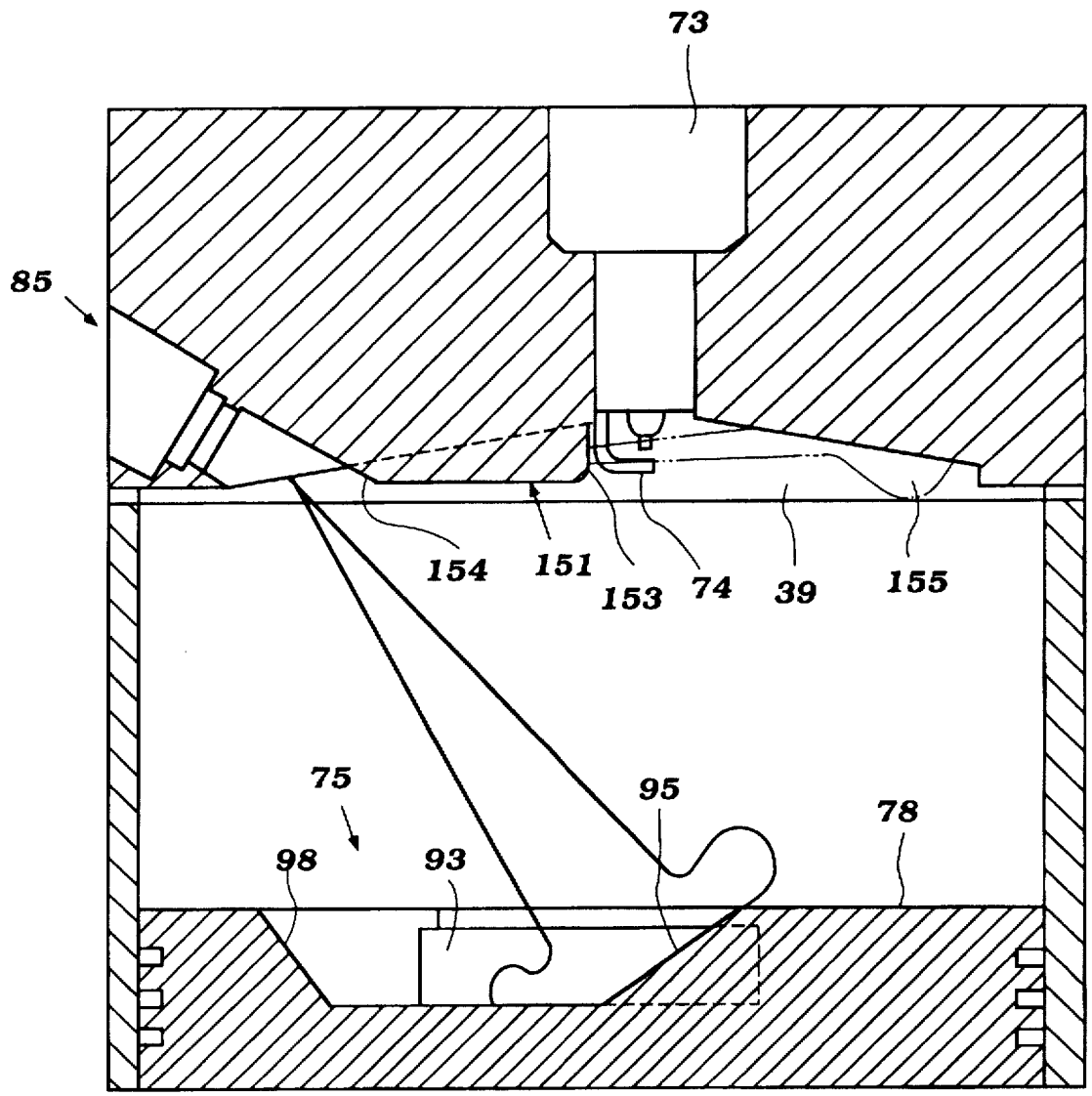
FIG. 16 is a partial cross-sectional view, in part similar to FIG. 2, and shows a preferred embodiment of the invention.
Figure 17:
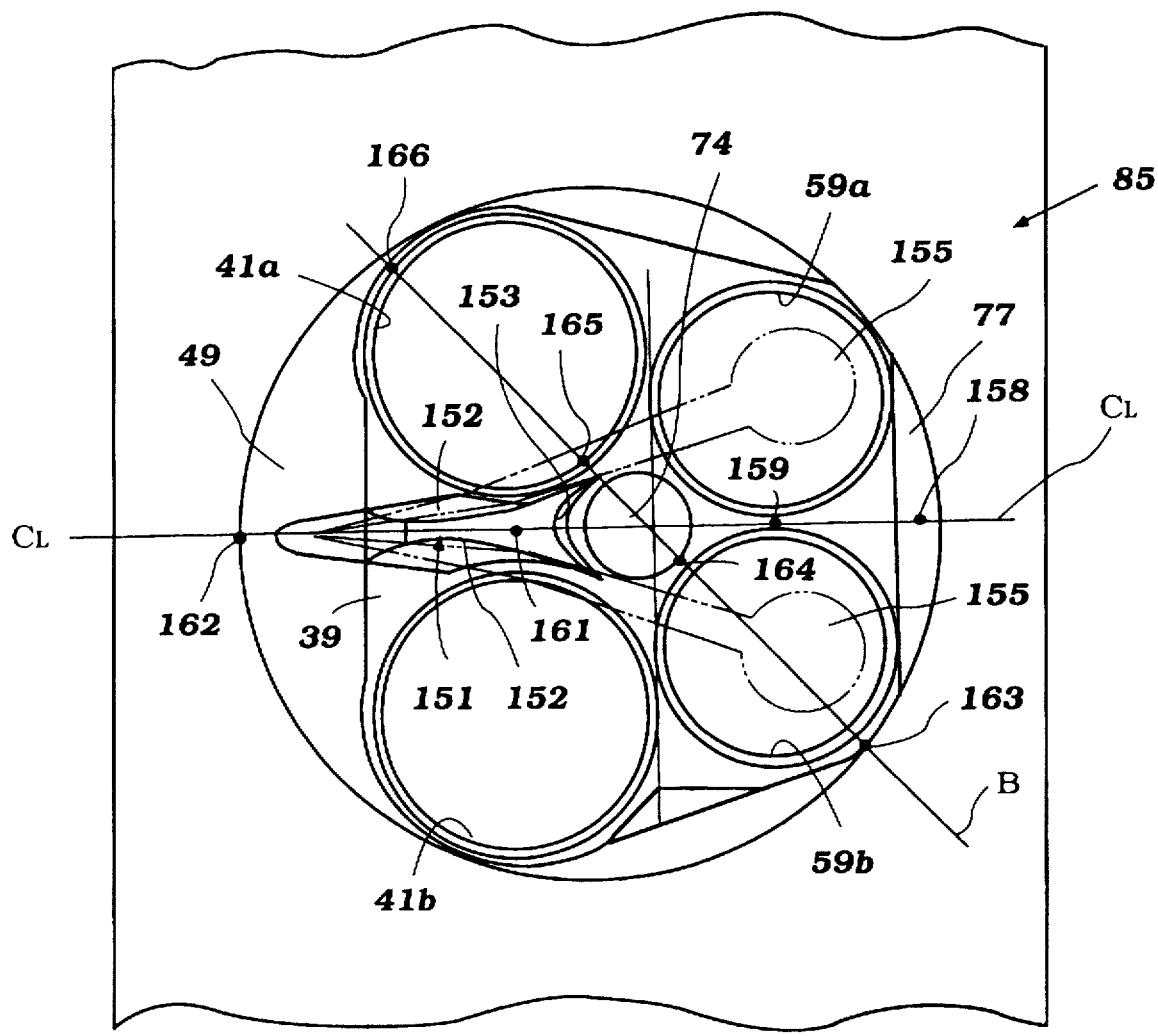
FIG. 17 is a bottom plan view of the cylinder head of this preferred embodiment and shows certain reference points at which temperatures are measured in order to explain features of the invention.
Figure 18:
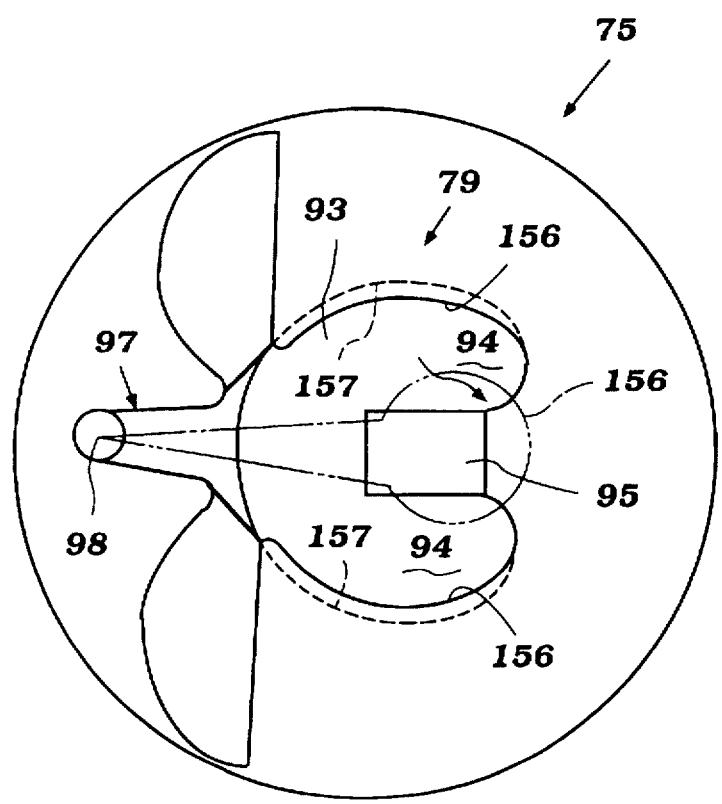
FIG. 18 is a top plan view of the piston head of this embodiment and shows the relationship of the fuel injector and spray pattern to the configuration of the head of the piston.

With the embodiments of the invention as thus far described, there is obtained, when desired, a good stratification of the fuel, even though the fuel injector 85 is placed so that its nozzle 87 discharging through the opening 88 is angularly disposed within the combustion chamber recess 39. However, because of the fact that this configuration is such that the injector 85, and specifically its discharge nozzle 87, is disposed somewhat in line with the gap 74 of the spark plug 73, there is a possibility that some stray fuel particles may deposit themselves in the spark gap 74. This gives a possibility of direct shorting and/or fouling of the spark plug, which would preclude its appropriate firing. FIGS. 16–18 illustrate another embodiment of the invention that incorporates a structure that can be utilized with any of the preceding embodiments in order to avoid these difficulties. Furthermore, these embodiments employ a structure which further assists in the fuel vaporization, and thus will ensure that all of the fuel injected by the injector 85 will be in a form that it can be easily burned when the spark plug 73 is fired.

In basic configuration, this embodiment is the same as those previously described, and therefore, where the construction is substantially the same, the same reference numerals previously utilized to identify those components will be used again. In this embodiment, the lower surface of the cylinder head where the recess 39 is formed is provided with a raised flow deflecting and controlling portion, indicated generally by the reference numeral 151. As may be seen in FIG. 17, this raised portion 151 is disposed so that it extends along a centerline C1, which centerline C1 extends generally perpendicular to the plane A containing the cylinder bore axis and which therefore passes generally between the intake valve seats 41a and 41b, and the exhaust valve seats 59a and 59b.

This projection 151 is bounded by a pair of groove-like portions which are formed on opposite spreading side surfaces 152 thereof which fan out and terminate in a curved surface 153 that is disposed in generally confronting relationship to the gap 74 of the spark plug 73.

As should be apparent, when the piston 75 is approaching its top dead center position, and if fuel is still being injected, the projection 151, and particularly a facing surface portion 154 thereof which faces the discharge from the injector 85, will cause the fuel to be redirected away from the spark gap 74 and toward the exhaust valves 64 and their exhaust valve seats 59a and 59b. This portion of the spray will come in contact with or in proximity to the heated heads of the exhaust valves, and any fuel which may reach this area will be heated and caused spread through the areas indicated at 155 to act to not only expand and vaporize, but also to cool the heads of the exhaust valves 64.

This fuel will be coupled with a large spread portion 156 of the fuel which has struck and been dissipated by the surface 95 of the piston recess so as to further cause the fuel in this area to be concentrated at the spark gap 74 when the piston 75 moves to its top dead center position.

Thus, the described construction, including the projection 151, will ensure against the depositing of liquid fuel on the spark plug gap 74, but will ensure that vaporized fuel is in the vicinity of the spark gap 74, particularly at the time of firing, so as to improve the full burning of the fuel and to assist in the stratification under those conditions when it is desired. This containment of the fuel is further assisted by providing ridges 156 around the upper periphery of the recessed portions 94 so as to result in annular areas 157 where the fuel will be confined and redirected.

Figure 19:
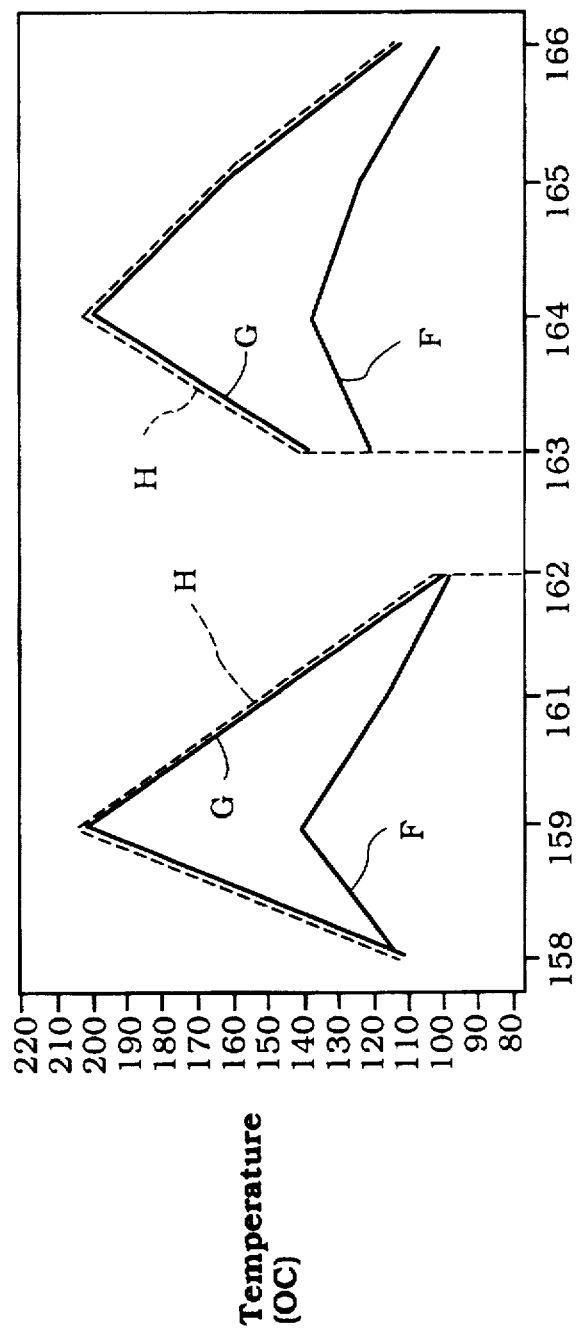
FIG. 19 is a temperature diagram showing the temperatures at certain points in the combustion chamber by reference to the points identified in FIG. 17 at varying engine speeds.
Figure 20:
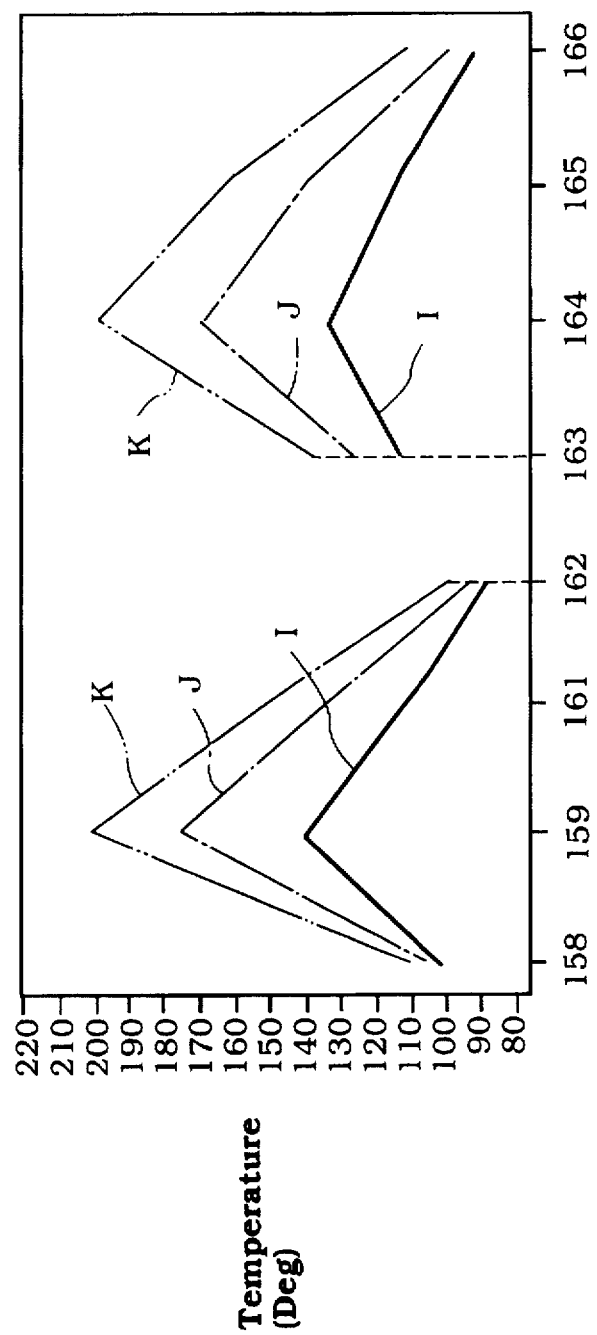
FIG. 20 is a further temperature diagram showing the temperatures at various positions in the combustion chamber at different vehicle speeds.

The temperature effect in the combustion chamber 39 at various locations and its relationship to the fuel spray for aiding in fuel vaporization can be understood best by reference to FIGS. 17, 19 and 20. Referring first to FIG. 17, certain reference points are selected in the combustion chamber 39 and specifically on the cylinder head surface thereof in order to show the temperature gradient in the combustion chamber during a variety of running conditions.

The points illustrated are a first series of points 158, 159, 161 and 162 that lie on the centerline C1. The point 158 is disposed in the squish area 77 adjacent the exhaust valve seats 59a and 59b. The point 159 is disposed immediately between these exhaust valve seats and the point 161 is disposed between the intake valve seats 41a and 41b. The point 162 is located in the intake side squish area 49 at the outer periphery of the cylinder bore 28.

A second series of reference points 163, 164, 165 and 166 are taken along a line B which passes generally diametrically through the center of the exhaust valve seat 59b and the intake valve seat 41a. The point 163 is disposed at the outer perimeter of the exhaust valve seat 59b adjacent the cylinder bore 28. The point 164 is taken slightly inwardly from the opposite side of the exhaust valve seat 59b and adjacent the spark gap 74. The point 165 lies on the side of the intake valve seat 41a adjacent the spark plug gap 74. The point 166 is diametrically opposite the point 165 and is on the outer periphery of the intake valve seat 41a adjacent the cylinder bore 28.

Referring first to FIG. 19, this illustrates the temperature gradients at the various points at three different engine speeds indicated at F, G, and H. The speed F is a relatively low speed such as 800 rpm while the points G and H are higher speeds such as 4,800 rpm and 5,600 rpm, respectively. As would be expected, the temperature on the centerline C1 is such that it is the lowest at the intake squish side point 162 with the next lowest temperature being at the exhaust squish side 158. The temperature between the intake valves at the point 161 is lower and the highest temperature exists generally at the point between the exhaust valve seats 59a and 59b at the point 159.

This temperature gradient maintains true at all engine speeds although it should be seen that the exhaust side gets much hotter as the engine speed and accordingly the load increases. Also, from the right-hand side curve, it will be seen that the intake valves run at a much lower temperature than do the exhaust valves with the side closest the spark gap being at a higher temperature than the side adjacent the cylinder bore. Thus, by spraying the fuel so that it will move into the areas 155 adjacent the exhaust valves 64, the fuel vaporization can be increased. This will also have some cooling effect on the valves.

The amount of distribution of the fuel in these areas can be changed by changing the shape of the projection 151 and specifically its width and the degree of obstruction that it places in front of the injection nozzle 87.

FIG. 20 is a family of curves of temperature at the same point but this shows the temperatures in relation to the speed at which a vehicle powered by the engine 21 is traveling. The curves I, J, and K represent speeds of 60 kilometers per hour, 120 kilometers per hour, and 180 kilometers per hour, respectively. It will be seen that again as the load on the engine increases the temperatures increase and basically the same temperature relationships as existed in FIG. 19 are found again. As previously noted, the vaporization of the fuel can be controlled by changing the shape of the projection 151 to change the amount of fuel that is directed toward the exhaust valve seats 59a and 59b.

Of course, the foregoing description is that of preferred embodiments of the invention, and various changes and modifications may be made without departing from the spirit and scope of the invention, as defined by the appended claims.

What is claimed is:

1. A direct injected internal combustion engine having a cylinder block defining a cylinder bore, a piston reciprocating in said cylinder bore, a cylinder head affixed to said cylinder block and closing said cylinder bore at one end of said piston, said cylinder head, said piston, and said cylinder bore forming a combustion chamber, a pair of intake valve seats formed in said cylinder head with their centers being positioned on one side of a plane containing the axis of said cylinder bore, a spark plug positioned in said combustion chamber with its gap being juxtaposed to said cylinder bore axis, a fuel injector mounted in said cylinder head between said intake valve seats and disposed at an angle so as to spray toward the other side of said plane containing said cylinder bore axis, and a projection formed in said cylinder head interposed between said fuel injector and said spark plug gap for precluding liquid fuel from said fuel injector from depositing on said spark plug gap.

2. A direct injected internal combustion engine as set forth in claim 1, further including a pair of exhaust valve seats formed in said cylinder head on the other side of the plane containing the cylinder bore axis.

3. A direct injected internal combustion engine as set forth in claim 2, wherein the projection formed on the cylinder head also directs the fuel spray toward the exhaust valve seats.

4. A direct injected internal combustion engine as set forth in claim 1, further including a cam shaft rotatably journaled within the cylinder head and operating a pair of intake valves that cooperate with the intake valve seats for controlling the flow therethrough, said cam shaft operating said intake valves directly through tappets.

5. A direct injected internal combustion engine as set forth in claim 4, wherein the axis of rotation of the cam shaft is disposed so as to overlie the cylinder bore and be disposed at least in part inwardly of its outer periphery.

6. A direct injected internal combustion engine as set forth in claim 3, further including a pair of intake passages extending through one side of the cylinder head and terminating at the intake valve seats, said intake passages having an angularly inclined straight portion extending toward the valves seats and terminating in a curved portion that joins them with the valve seats.

7. A direct injected internal combustion engine as set forth in claim 6, wherein the fuel injector is disposed in substantial part below the straight portions of the intake passages and between them.

8. A direct injected internal combustion engine as set forth in claim 1, further including a recess formed in the head of the piston and disposed in the path of the spray from the fuel injector when the piston approaches its top dead center position.

9. A direct injected internal combustion engine as set forth in claim 8, wherein the recess in the piston head is formed with a peripheral edge in confronting relationship to the spray from the fuel injector, said confronting peripheral edge being oriented to direct a portion of the spray into the recess and a further portion of the spray toward the cylinder head.

10. A direct injected internal combustion engine as set forth in claim 9, wherein the further portion of the spray is directed toward the gap of the spark plug.

11. A direct injected internal combustion engine as set forth in claim 10, wherein the confronting peripheral edge is formed by an upstanding projection which extends into and divides a portion of the piston recess into a pair of side portions.

12. A direct injected internal combustion engine as set forth in claim 11, wherein the piston recess has an inclined entry groove formed on the side thereof adjacent the fuel injector.

13. A direct injected internal combustion engine as set forth in claim 10, further including a pair of exhaust valve seats formed in said cylinder head on the other side of the plane containing the cylinder bore axis.

14. A direct injected internal combustion engine as set forth in claim 13, wherein a further portion of the spray is directed toward the exhaust valve seats.

15. A direct injected internal combustion engine as set forth in claim 14, wherein the piston recess has a pair of generally circular sections in confronting relation to the exhaust valve seats.

16. A direct injected internal combustion engine as set forth in claim 15, wherein the piston generally circular sections have inwardly extending ridges at their upper edges.

17. A direct injected internal combustion engine having a cylinder block defining a cylinder bore, a piston reciprocating in said cylinder bore, a cylinder head affixed to said cylinder block and closing said cylinder bore at one end of said piston, said cylinder head, said piston, and said cylinder bore forming a combustion chamber, a pair of intake valve seats formed in said cylinder head with their centers being positioned on one side of a plane containing the axis of said cylinder bore, a pair of exhaust valve seats formed in said cylinder head on the other side of said plane containing said cylinder bore axis, a spark plug positioned in said combustion chamber with its gap being juxtaposed to said cylinder bore axis, a fuel injector mounted in said cylinder head between said intake valve seats and disposed at an angle so as to spray toward the other side of said plane, and a projection formed in said cylinder head interposed between said fuel injector and said spark plug and disposed for directing the fuel sprayed therefrom toward said exhaust valve seats.

18. A direct injected internal combustion engine as set forth in claim 17, further including a recess formed in the head of the piston and disposed in the path of the spray from the fuel injector when the piston approaches its top dead center position.

19. A direct injected internal combustion engine as set forth in claim 18, wherein the recess in the piston head is formed with a peripheral edge in confronting relationship to the spray from the fuel injector, said confronting peripheral edge being oriented to direct a portion of the spray into the recess and a further portion of the spray toward the cylinder head.

20. A direct injected internal combustion engine as set forth in claim 19, wherein the further portion of the spray is directed toward the gap of the spark plug.

21. A direct injected internal combustion engine as set forth in claim 20, wherein the confronting peripheral edge is formed by an upstanding projection which extends into and divides a portion of the piston recess into a pair of side portions.

22. A direct injected internal combustion engine as set forth in claim 21, wherein the piston recess has an inclined entry groove formed on the side thereof adjacent the fuel injector.

23. A direct injected internal combustion engine as set forth in claim 22, wherein a further portion of the spray is directed toward the exhaust valve seats.

24. A direct injected internal combustion engine as set forth in claim 23, wherein the piston recess has a pair of generally circular sections in confronting relation to the exhaust valve seats.

25. A direct injected internal combustion engine as set forth in claim 24, wherein the piston generally circular sections have inwardly extending ridges at their upper edges.

* * * * *